United States Patent [19]

Forester

[11] Patent Number: 4,499,919
[45] Date of Patent: Feb. 19, 1985

[54] VALVE

[76] Inventor: Buford G. Forester, #9 Cumberland Trail, Conroe, Tex. 77302

[21] Appl. No.: 279,430

[22] Filed: Jul. 1, 1981

Related U.S. Application Data

[62] Division of Ser. No. 101,424, Dec. 10, 1979, Pat. No. 4,304,261.

[51] Int. Cl.³ ............................ F16K 5/10; F16H 1/04
[52] U.S. Cl. ............................... 137/613; 137/246.22; 251/152; 251/185; 251/367
[58] Field of Search ............... 251/152, 367, 208, 209, 251/175, 185; 137/613, 315, 246.22; 74/422, 425

[56] References Cited

U.S. PATENT DOCUMENTS

| | | | |
|---|---|---|---|
| 2,636,713 | 4/1953 | Hamer | 137/315 |
| 2,952,437 | 9/1960 | Knox | 251/249.5 |
| 3,249,117 | 5/1966 | Edwarde | 137/315 |
| 3,274,847 | 9/1966 | Jones | 74/425 |
| 3,337,178 | 8/1967 | Gordon | 137/613 |
| 3,430,651 | 3/1969 | Jackoboice | 137/613 |
| 3,552,222 | 1/1971 | Eck | 74/216.3 |
| 3,765,440 | 10/1973 | Grove et al. | 137/246.22 |

*Primary Examiner*—A. Michael Chambers
*Attorney, Agent, or Firm*—Neal J. Mosely

[57] ABSTRACT

An improved valve is disclosed. In the preferred and illustrated embodiment, the valve utilizes a flat disk within a valve body, the disk supporting a peripheral groove having bearings therein for alignment and to enable rotation, and further includes pressure balanced opposing faces and receives a valve seat therein. The flat disk and body arrangement reduces the size of a large valve and reduces the wear occurring on the valve seat and seal mechanism. Alternate embodiments and configurations are disclosed.

10 Claims, 8 Drawing Figures

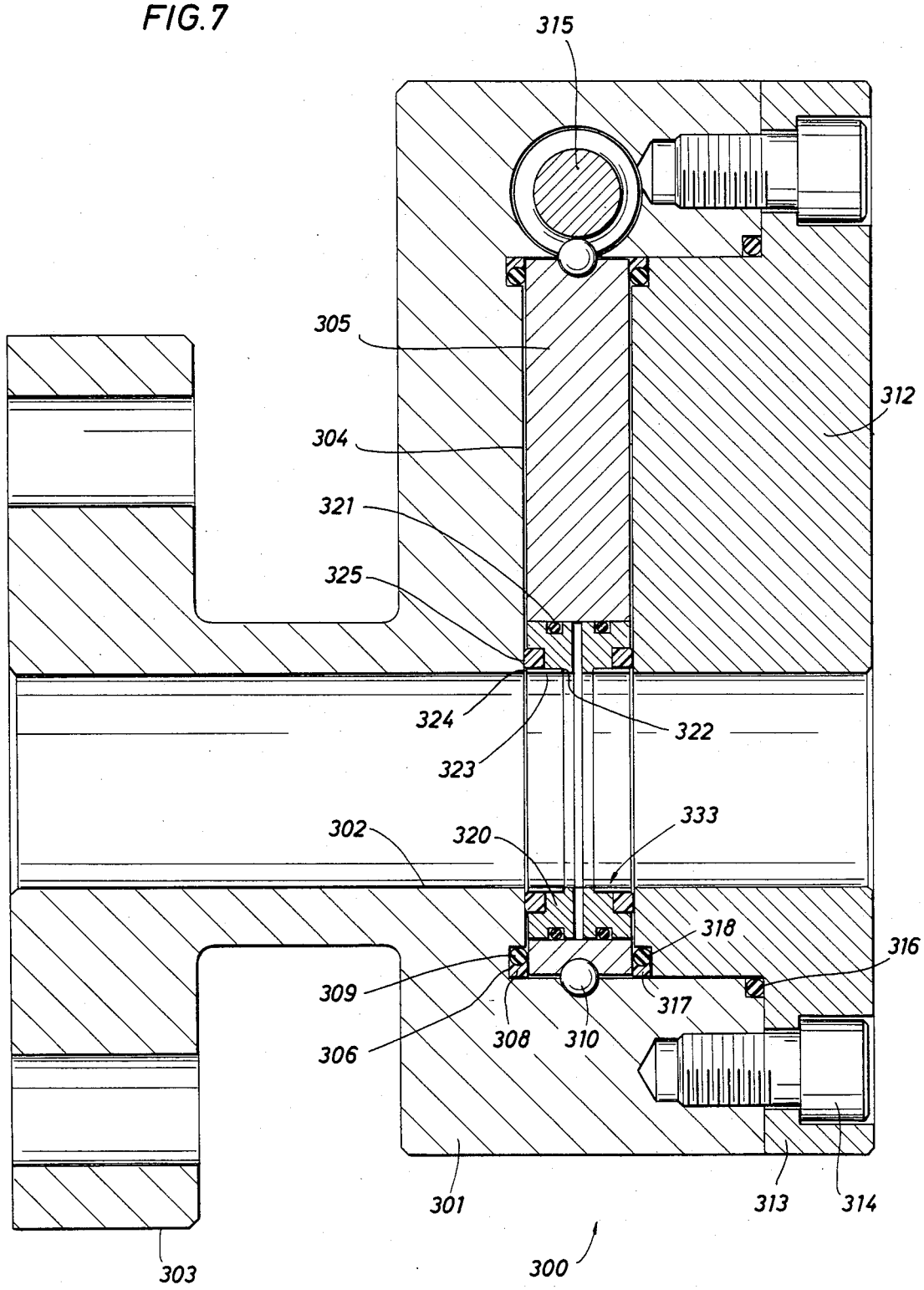

VALVE

CROSS REFERENCE TO RELATED PATENT APPLICATION

This application is a division of co-pending application Ser. No. 101,424, filed Dec. 10, 1979, now U.S. Pat. No. 4,304,261 issued Dec. 8, 1981.

BACKGROUND OF THE INVENTION

Field of the Invention

A Christmas tree installed on a producing well ordinarily must have two valves in it. One is used routinely, while the other is kept open, being incorporated as a backup valve. Through the two-valve arrangement, safety is assured should failure of the one customarily used occur. While the structure may incorporate two valves for safety, there is some sacrifice. The Christmas tree stands quite tall on incorporating two valves. This is particularly true in the instance where ball or plug valves are used. As will be appreciated, as the diameter of the pipe cooperative with the valve increases, the valve also must increase in diameter. This inevitably increases the size and weight of the valve structure, and, on coupling two valves serially, the structure can become quite large. As it increases in size, cost also increases. An increase in size also requires more expensive valve operator mechanisms. A valve operator mechanism of increased capacity is required to open and close larger valves.

The present invention provides an alternate approach to the construction of duplicate valve structures. The apparatus provides a much shorter valve body structure. The valve body is reduced in height through the use of flatdisks. While the disk can be increased substantially in diameter, the thickness of the disk can remain fairly constant so that the valve body has a limited height, even for very large diameter pipe. Thickness of the disk is more nearly dependent on the pressure rating than the diamete of the valved line.

The present apparatus is less costly to manufacture. It incorporates a valve disk which is rotated. At the time of manufacture of the valve disk, it is constructed with a surrounding groove. It is not necessary to cut a gear on the outer surface. Rather, the gear is formed of a succession of ball bearings received in an outer groove and cooperative with a raceway in the valve body. The multiple bearings in succession thus function as a driven gear for rotating the disk. They are readily engaged with a drive motor and worm for opening or closing the disk within the valve body.

Cost of fabrication of the present apparatus is reduced through the utilization of a flat disk to support the valve element. It is easier to machine a round disk in comparison with a tapered plug or sphere. Machining of the valve body is also easier as a result of the shape of the valve disk. The use of a disk enhances pressure sealing to obtain a balance across the disk when the valve is open so that opening and closing of the valve is accomplished against reduced loading as a result of pressure differential. The pressure differential which occurs in this structure is used to energize the seat or seal supported within the flat disk. The seat or seal mechanism is received in a counterbored passage through the valve disk, the passage being constructed with counterbores for receiving the seat in it against bias springs which load the seat against the sealing surface.

Various alternate forms of the apparatus are disclosed. One alternate form incorporates seats which face in both directions to thereby accommodate flow in both directions. Another embodiment utilizes a flat valve disk supported on bearings which is rotated to serve as a safety cutoff valve in a mud flow choke. The choke is also formed in a flat valve disk. The choke is furnished with a throttled opening formed from a very hard metal such as tungsten carbide. The throttled portion of the passage is in the form of a replaceable insert. To the extent that the throttle is fairly long, the structure utilizes a pair of rotatable disks, and the insert is formed in two pieces. When the flat valve disk which supports the insert is aligned with the inlet and outlet opening through the valve, flow through the constricted choke insert occurs. When the choke wears badly and requires replacement, the flat valve disk is rotated to close the choke assembly to the flow of drilling mud. The flat valve disk is rotated so that the choke is no longer aligned with the flow between inlet and outlet of the assembly. Rather, the choke is then positioned adjacent to a removable plug in the body, the plug limiting access to the choke insert. The plug is removed, and the choke is removed through the plugged opening in the body for easy replacement.

BRIEF SUMMARY OF THE DISCLOSURE

This disclosure is directed to a valve utilizing stacked valve disks which are exposed to a pressure balance acting on opposite faces thereof. The disk includes a transverse passage drilled through the disk which passage is counterbored to receive a seat or seal mechanism therein spring loaded by a bias means against the sealing surface. The disk is circular and is cut with an external groove which matches a raceway formed in the valve body to receive a procession of uniform sized ball bearings in the groove, and one of the bearings is a rounded top reference pin which locks to the disk. Through the use of a hydraulic operator engaging a worm gear, the ball bearings are engaged in the fashion of a gear and rotated to carry the disk between the open and closed positions.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIG. 7 is a sectional view through an additional alternative embodiment of the valve of the present invention disclosing a valve disk having seals operable in both directions.

DETAILED DESCRIPTION OF THE ILLUSTRATED EMBODIMENTS

Figure 1:
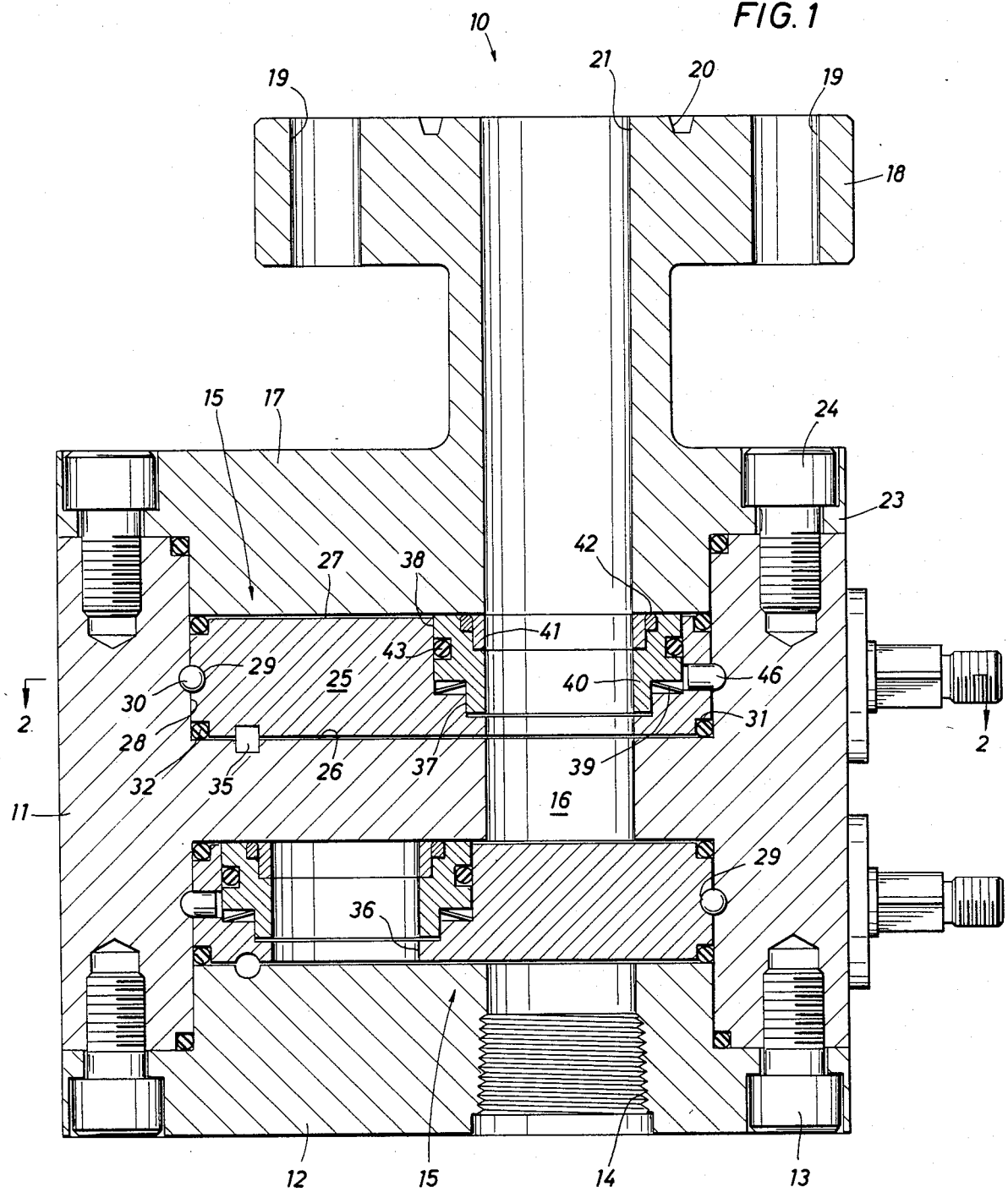
FIG. 1 is a sectional view through a preferred embodiment of the present invention disclosing a valve body with a pair of disk valves therein, the disk valves being serially connected and each having a cooperative seal for sealing.

In FIG. 1 of the drawings, the numeral 10 identifies a valve constructed in accordance with this invention. The valve includes a valve body with two valves in it. They are serially connected so that one is always available for standby or safety purposes. Should one valve fail, the second valve is readily available as a backup.

The valve shown in FIG. 1 incorporates a valve body 11 which is generally cylindrical and counterbored at the lower end. A circular plate 12 is joined to the valve body 11 by means of head bolts 13. Several bolts are incorporated and join to a facing flange enabling connection of the plate 12 to the flange. The plate 12 is drilled with a threaded or tapped hole 14 which is the inlet for the valve structure. The high pressure side of the valve is at the tapped opening 14.

The circular plate 12 captures a first valve element 15 in the valve body. The valve body is drilled with a countersunk hole sized to receive the valve disk 15 in it. The opening 14 connects with a passage 16 extending through the valve body which is the flow path from the inlet at 14. The flow path opens into a flanged body part 17 which terminates at a flange 18. The flange 18 is equipped with bolt holes 19 to enable the flange to be joined to a connected pipe. A seal ring 20 is formed around the outlet opening 21. The opening 21 in the flange 18 is provided to connect to cooperative equipment.

The body part 17 is received in a countersunk opening aligned with the first valve disk 15. A second valve disk 15 is also included. The two are identical to one another and differ only in that one is positioned against the lower circular plate 12 and the other is positioned above the valve body 11 and held in position by the body part 17. Because the two are identical, it is necessary to describe only one of the valve disks. They function in the same manner. Two are included within the valve body to provide a backup or safety cutoff valve in the event that one of the two fails.

The valve body part 17 is equipped with a protruding, circular shoulder 23 which is drilled at spaced locations to receive head bolts 24. The bolts 24 anchor the part 17 to the valve body. When the bolts 24 are threaded into the valve body, they clamp the valve disk 17 in the operative position. Because two valve disks are incorporated, they serially control the flow so that both must be open to permit any flow. The lower one is shown in the closed position. The upper is in the open position. When both are open, fluid flows from the tapped inlet 14 through the outlet 21. Flow is under the control of both valve disks.

The valve disk 15 includes a circular, plate-like body 25 which has a pair of parallel faces 26 and 27. The faces 26 and 27 are parallel and extend to a cylindrical outer surface at 28. The outer face 28 is a right-cylindrical construction and is interrupted only by an encircling groove 29. The groove 29 receives ball bearings 30 in it. The valve body 11 is cut with a semicircular mating groove so that the two grooves together define a pathway of sufficient size to receive ball bearings 30 in the pathway without binding. The ball bearings 30 are thus serially arranged in the encircling half grooves to fully encircle the disk 25.

Figure 2:
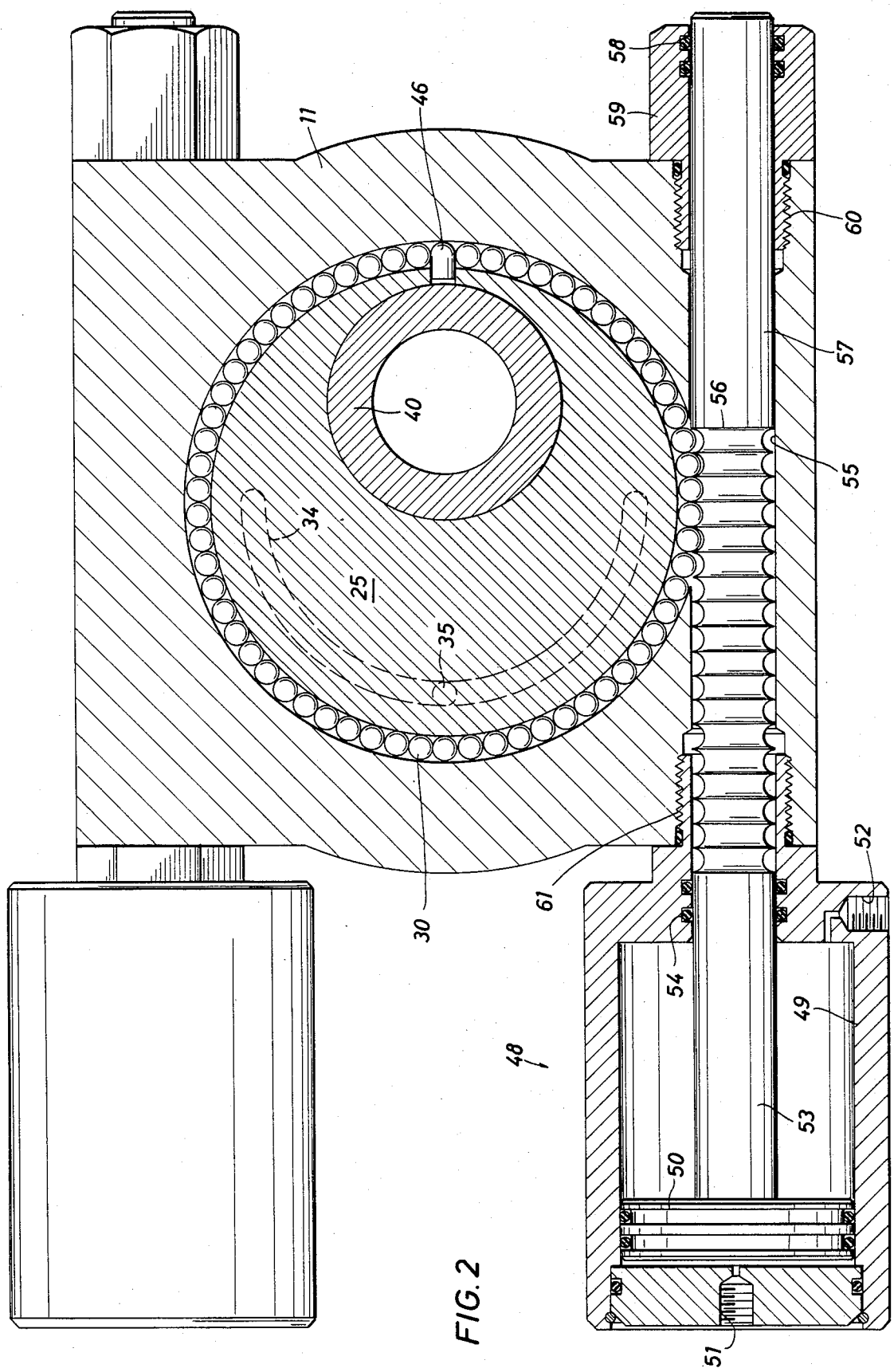
FIG. 2 is a view along the line 2—2 of FIG. 1 showing the disk and a valve operator for the disk.

The disk 25 is notched at all corners 31 to enable a seal ring 32 to be positioned about both faces of the disk 25. The seal members provide sealing against the flow of fluid flowing in the pipeline, thereby denying access of the pipeline fluid to the ball bearings 30. The ball bearings 30 align the apparatus. The range of rotation is controlled by a circular groove formed in one face of the disk 25, the groove being indentified by the numeral 34 in FIG. 2. This groove cooperates with a pin 35 which is fixed and has an upstanding portion profiled to fit in the groove 34. As shown in FIG. 2, the pin limits the travel of the valve disk 15. The valve disk 15 is able to rotate to the extent permitted by the pin. The pin serves as a stop between the two extremes of movement and limits the rotation. Ninety degrees is typically adequate, although 180.0 degrees enhance the life of the seal mechanisms on the valve disk.

Returning now to FIG. 1 of the drawings, the valve disk 15 is drilled with the axial passage 36 which is countersunk to a larger diameter at 37 and is again countersunk to an even larger diameter 38. This enables a seal assembly to be inserted into the passage. A Bellville spring 39 is inserted on the shoulder adjacent to the countersunk bore 38. It pushes against a seat insert 40 which as a protruding skirt which telescopes with clearance into the countersunk bore 37. The seat is enlarged to fit in the bore 38. It captures the Bellville spring 39 and is forced upwardly as viewed in FIG. 1 of the drawings. The seat assembly is, itself, countersunk, and a sleeve 41 is inserted into it to capture a seal ring 42. The seal ring 42 bears against the face of the body part 17 and seals against it. The seal ring 42 is positioned around the passage through the valve to thereby perfect a seal at that location. The seal ring 42 is locked in position by the cylindrical sleeve 41. It is undercut at the exposed face so that the seal ring 42 is held in position.

An O-ring seal 43 is seated in a groove on the exterior of the seat assembly 40. The seat assembly thus prevents leakage along the axial path through the valve disk 15 and also seals at the seal 42 when the valve is opened. When the valve is closed, fluid under pressure flows to the passage through the valve disk 15, but does not leak past it. FIG. 1 shows the lower valve closed, and it will be understood from the foregoing description how the seal rings 42 and 43 prevent communication past both disk valves 15.

The valve disk 15 is positioned in the countersunk hole shaped for it. After it is inserted, but prior to insertion of the valve seat assembly 40, ball bearings 30 are fed through a lateral port into the groove. The ball bearings are added until the groove is full. Thereafter, a dome-shaped pin 46 is inserted. The pin 46 is partially round, but it is sufficiently long that it cannot enter into the circular groove or raceway around the valve disk 15. The last ball bearing inserted is the pin 46. The pin 46 is inserted along a radial passage shown in FIG. 1. Once it is in place, the disk 25 is inserted behind the pin to lock the pin in the passage where the domes end protrudes into the grooves. Because it cannot enter the encircling passage, the pin 46 serves several purposes.

First of all, it locks all the bearings in the grooves and thereby locks the valve disk 15 in place. The valve disk 15 is captured at this juncture and is not able to escape the valve body 11. The pin 46 serves another purpose, namely, it limits rotation of the bearings around the disk 25. While the individual ball bearings are free to roll, they are locked relatively to one another and to the valve disk 15 by pin 46. In other words, they function as teeth on a gear because they are held at a relative location. This is understood by viewing FIG. 2 of the drawings. The dome-shaped pin 46 is fixed and not able to move. It is fixed and, therefore, serves the purpose of securing every bearing 30 to a specified location about the disk. The bearings collectively turn as a unit with the disk. They do not move independently of the disk. Individual bearings rotate, but the rotation does not alter their location relative to the disk 25. The bearings reduce drag on opening or closing the disk. They also maintain their relative position in the grooves, secured in place by the groove which aligns bearings for support of the disk in motion or under pressure from use in a fluid line.

The disk 25 shown in FIG. 2 is rotated by the operator illustrated there. The numeral 48 identifies an operator motive means. In this instance, it is comprised of a cylindrical housing 49 with a piston 50 in the housing. A port 51 introduces hydraulic oil under pressure to one side of the piston. A second port 52 introduces oil under pressure to the otherside. When oil under pressure is delivered to either side, the piston is driven in the indicated direction and imparts movement to a piston rod 53. The rod 53 emerges from the cylindrical housing 49 through a set of seals 54 which prevent leakage of hydraulic fluid.

The rod 53 extends through a drilled passage 55 in the body 11, the passage intersecting the countersunk hole provided for the valve disk. The passage 55 tangentially intercepts the perpendicular hole in the body so that the piston rod 53 is able to impart motion to the valve disk 15. The piston rod 53 has a number of grooves 56 cut around it for a selected portion of the rod. The grooves 56 are all identical. The grooves 56 have a depth or pitch which enables them to partially engage or extend around one of the bearings 30. They partially enclose the bearings as shown in FIG. 2 of the drawings. It will be observed that the interception of the two drilled passages in the valve body 11 is such that several bearings are brought close to the grooves, and the grooves, having a pitch approximately equal to the diameter of the bearings 30, thereby encompass or grasp individual bearings. The rod 53 has a smooth portion 57 at the lower end which extends through seals 58. The seals are supported in a threaded fitting 59.

The fitting 59 is threaded into a counterbored passage in the valve body, there being a threaded joinder at 60. In like fashion, the cylindrical body 49 threads to the valve body 11 at 61. This prevents the leakage of fluid flowing through the valve into the operative parts of the operator shown in FIG. 2.

Figure 3:
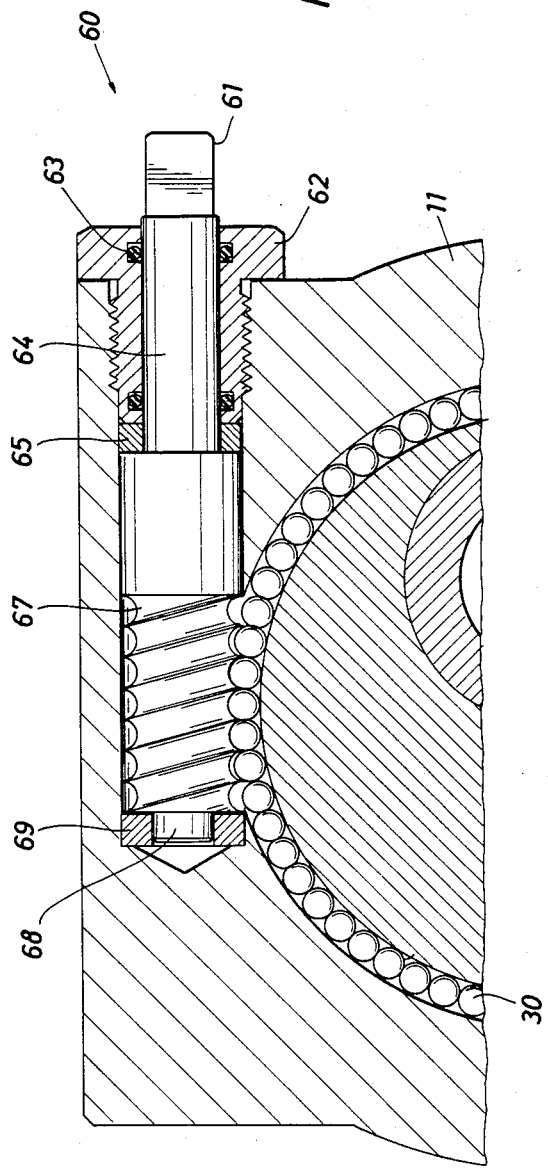
FIG. 3 is a sectional view of an alternate form of operator to be contrasted with the operator structure of FIG. 2.

FIG. 3 of the drawing shows an alternate form of operator identified generally by the numeral 60. The operator 60 utilizes a square or hexagonal socket drive 61 which protrudes on the exterior. The valve body 11 supports a threaded plug 62 which receives seal rings at 63. They again, prevent leakage along the operator. The socket drive 61 connects with an elongate shaft 64 which passes through a seal at 65. The seal 65 is captured against a shoulder of the plug 62. The shaft 64 is larger and thereby provides a second shoulder to hold the seal 65 in place. The shaft 64 is encircled by a helical thread 67 on the exterior. The thread 67 has a lead and pitch enabling the bearings 30 to be engaged by the thread. FIG. 3 discloses how individual bearings fit in the threads cut on the driven shaft 64. The shaft 64 terminates at a stub shaft 68 which provides support for a rotating seal 69. The seals 65 and 69 are preferably similar to one another, and they also function as thrust bearings. The operator shown in FIG. 3 is a rotary drive mechanism. FIG. 2 shows an operator which responds to hydraulic pressure and forms a linear stroke to open or close the valve. Rotary motion imparted to the socket 61 in FIG. 3 rotates the screw threads shown at 67 to thereby operate in the fashion of a worm gear cooperative with a toothed gear. While no tooth gear is present, the bearings 30 function as a tooth gear when driven by the worm gear. A single or double turn is included in the drive shaft shown in FIG. 3.

Figure 4:
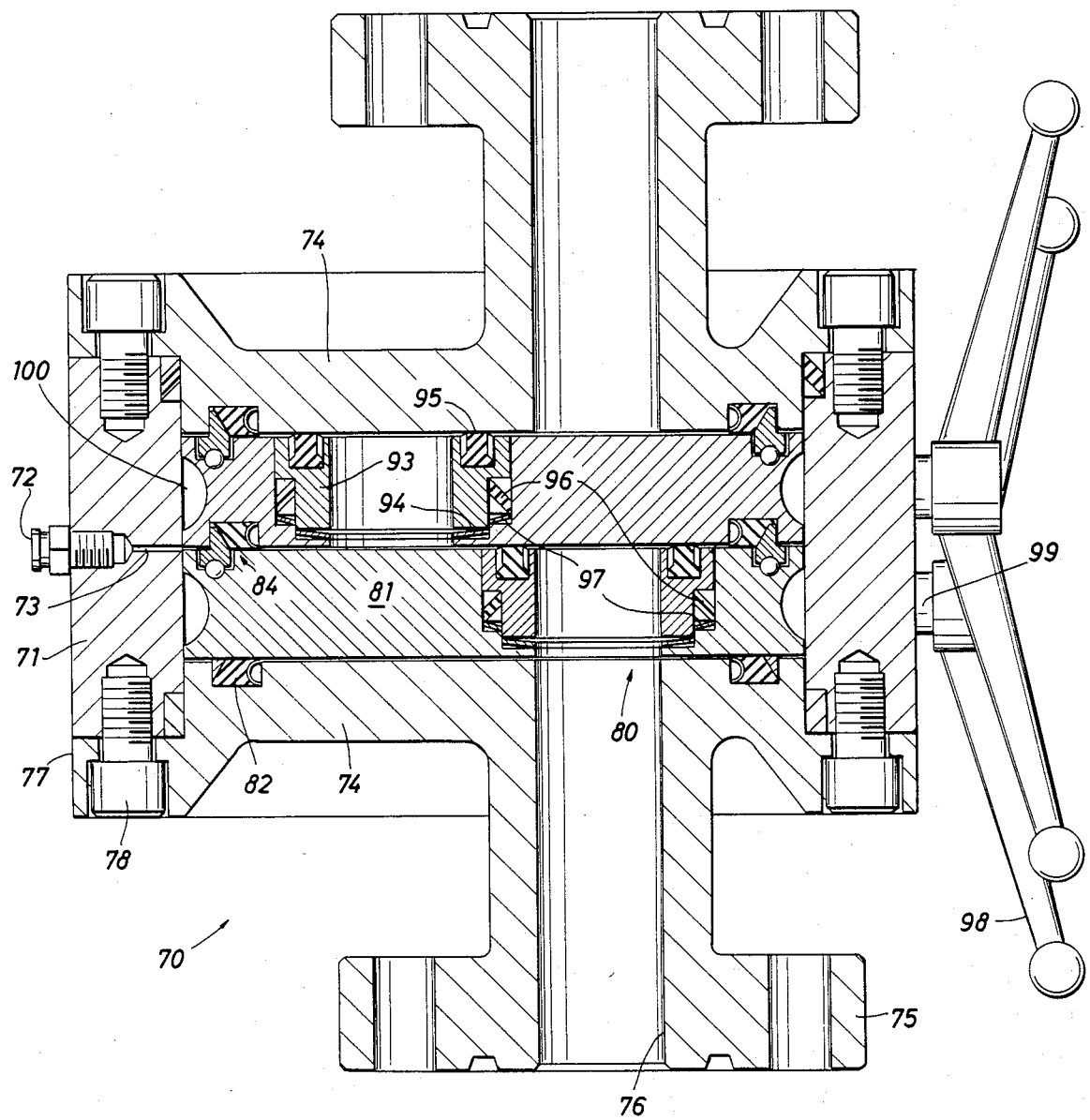
FIG. 4 is a sectional view through an alternate embodiment of the valve of the present invention disclosing a pair of valve disks in contact with one another.
Figure 5:
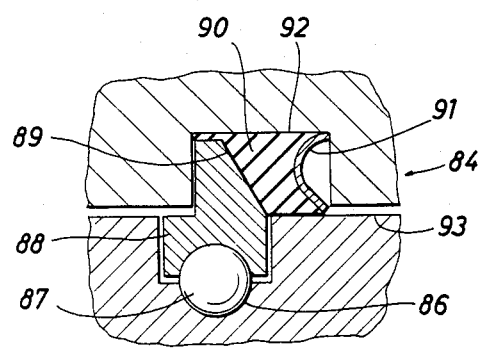
FIG. 5 is an enlarged, detailed view of a valve seal construction.

Attention is next directed to FIG. 4 of the drawings, where an alternate embodiment is identified by the numeral 70. The embodiment 70 incorporates a valve body 71 which is primarily an elongate, cylindrical sleeve which axially hollow. The sleeve construction incorporates a grease fitting 72 which communicates through a passage 73 to deliver lubricant to the interior of the valve as required. The sleeve 71 is joined to a lower flanged fitting 74 which terminates at a flange 75 and has centralized passage 76. The passage 76 extends fully through the lower fitting 74. The fitting 74 has a second flange at 77. Both flanges incorporate bolt holes on a common diameter, and bolts 78 are shown for the purpose of attaching the fitting 74 to the valve body 71. An upper flange is incorporated, and it is identical in construction to the flange 74 and, therefore, bears the same reference numeral. While it is identical, it is connected to be on the downstream side of the valve apparatus 70. The fittings 74 are thus identical to one another and both bolt to the valve body 71. The body 71 is relatively easy to machine. The valve body portions 74 reduce cost inasmuch as there are two required, and they are identical to one another. The apparatus also used duplicate valve disks which are identified generally by the numeral 80. They are duplicate, and, again, a description of one will suffice. The valve disk 80 incorporates a circular, flat body 81 having a seal 82 around the lower periphery. The seal 82 is parallel to an upper seal generally identified at 84 in FIG. 5. The seal 84 is shown in detail at FIG. 5 to comprise a groove 86 which receives therein a set of ball bearings 87. They provide rolling support between the seal assembly and the valve disk which supports it. A profiled ring 88 rests on the bearings 87. The ring 88 has a semicircular groove cut in it to ride on the bearings 87. The profiled ring 88 stands erect with a tapered face 89 which abuts a seal ring 90. The seal ring 90 is loaded by a continuous strip of spring metal 91. The spring strip 91 forces the seal ring against the tapered face 89 and squeezes the seal ring 90 toward the contacted surfaces. The seal ring 90 is fabricated from a soft plastic material which is self-wiping. It extrudes slightly, being caught between the snap ring 91 and the angled face 89. It extrudes upward in FIG. 5 to wipe and thereby seal the surface above it. It also extrudes downwardly to wipe and contact the surface which limits it. As shown in FIG. 5, it is caught between a pair of parallel surfaces at 92 and 93 and thereby forms adequate sealing between these two surfaces.

The surfaces 92 and 93 are thus sealed by the seal assembly shown at 84. Leakage cannot flow past these surfaces.

Going again to FIG. 4, the lowermost valve disk 81 incorporates the seal assembly 84 on its upper face which is a seal for the uppermost valve disk. This, again, is repeated at the top of the second valve disk. The seal 82 is an abbreviated portion of the apparatus shown in FIG. 5. Again, a snap ring is included to provide radially outwardly expanding force against the softer seal ring.

The structure of FIG. 4 utilizes a seal assembly 93 similar in construction to the valve seat assembly 40 previously shown. It rests on a first Bellville spring 94 which loads it compressively to thereby actuate a plastic seal ring 95 at the opposite end. Leakage along the exterior is prevented by a seal ring 96 which is loaded by a second Bellville washer 97. The Bellville washer 97 provides a compressive force to expand the seal ring 96 into sealing contact with the surrounding structure.

As will be observed in FIG. 4 of the drawings, the stack of two valve disks includes two complete seal rings of the sort shown in FIG. 5 and an abbreviated version thereof at 82. The stacking of the two valve disks eliminates some of the complexity so that three sets of seals around the valve disks will suffice. Looking at FIG. 4 for sealing along the axis through the valve, each valve seat assembly is provided with a seal on its exterior and on its end face.

The valve disks at 80 are rotated by a hand-cranked operator utilizing a rotatable wheel 98 which connects through a shaft 99 to rotate a worm gear of the sort shown in FIG. 3. The worm engages the valve disk 80 and rotates it. Engagement is accomplished by means of the bearing and raceway arrangement shown in FIG. 3. Alternatively, the apparatus can be constructed with gear teeth, and to this end, the numeral 100 identifies a protruding tooth. Each gear tooth is separated by a suitable valley between adjacent teeth, the pitch being consistent around the periphery of the valve disk to conform to the pitch on the helix of the worm drive.

Figure 6:
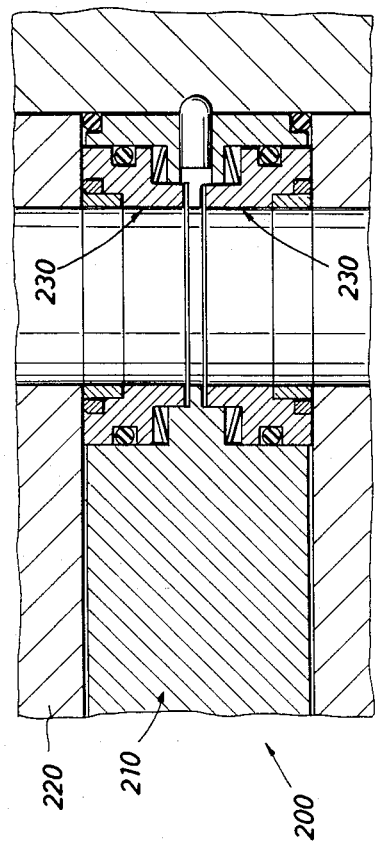
FIG. 6 shows another modification to the valve disk of the present invention.

Attention is next directed to FIG. 6 of the drawings, where the numeral 200 identifies an alternate embodiment. Briefly, a single disk 210 is received in a valve body 220. The disk is made bidirectional and includes valve seat and seal mechanisms 230 facing upstream and downstream. They are identical, but differ only in their installed orientation. It will be recalled that the valve disk shown in FIG. 1 presumes that high pressure impinges from the bottom of the valve flowing toward the top. The high pressure end sets the seal mechanism which includes the seal ring 42 in FIG. 1. If the high pressure can come from either direction, the arrangement of FIG. 6 will accommodate this and thereby energize the seal and pressure force the seal into operation.

The arrangement of FIG. 6 is particularly useful where the direction of flow is not known. It is also useful where there are back pressure surges which will exceed the expected input pressure. If, for instance, the input pressure is 1,000 psi and the back pressure periodically surges above this, the device will perfect a seal in one direction or the other suitable to withhold the ambient pressure or the opposing surge of pressure. This arrangement is advantageous in that leakage through the valve is prevented. In other words, a valve seat seal assembly is incorporated which is pressure responsive to seal in either direction. FIG. 6 also discloses the ball bearing arrangement with the domed pin inserted into the groove.

Attention is now directed to FIG. 7 of the drawings where the numeral 300 identifies the illustrated embodiment incorporating a valve body 301. The valve body 301 is generally cylindrical on its exterior and is defined by an end face. An inlet in the valve body 301 is drilled at 302. A flange is incorporated at 303 and is aligned with the inlet 302 and is optionally included to enable connection with an upstream or downstream apparatus. The flange 303 communicates through a passage passing through the valve. The valve body is drilled with a circular hole which terminates at a flat circular face 304. The face 304 is sized to receive a flat valve disk 305 which is placed in the valve body. A groove 306 is also incorporated to support and receive a seal assembly comprising a hard spacer ring 308 adjacent to an O-ring 309. The flat valve disk is positioned against the face 304 for rotation.

The valve body 301 is internally grooved with a semicircular groove to receive bearings 310. They are installed and locked in position in the same manner as described with earlier embodiments, namely, a plurality of bearings is positioned in the groove. One of the bearings is a pin which is pinned to the valve disk 305. Accordingly, the pinned bearing cannot rotate and is locked in position relative to the disk. Because it cannot rotate, it causes the entire sequence of bearing to rotate with it. This enables the bearings to function as a friction reducing support for the disk and to additionally function as a toothed gear to impart rotation to the disk 305.

The flat valve disk 305 is held in position by an insert 312. The insert 312 has a cross-sectional area matching the cylindrical drilled hole which terminates at the face 304. It terminates at a surrounding flange 313, and suitable bolts 314 are utilized to attach the insert 312 in the illustrated position, thereby clamping the flat valve disk 305 in position to operate within the valve body 301.

The numeral 315 identifies an operator rod which is moved perpendicular to the plane of FIG. 7, thereby imparting rotation to the disk 305 by engaging the bearings 310 which surround the disk.

Leakage is prevented by an O-ring seal 316 and a second seal assembly having a ring 317 adjacent to a seal ring 318.

The seals which have been mentioned to this juncture are around the periphery of the flat valve disk 305. There is an additional seal structure included in the disk 305. In the open position of FIG. 7, axial flow through the passage at the inlet 302 may occur in an unrestrained fashion. When the valve is closed, the disk is rotated so that the disk closes off the passage, thereby preventing flow through the equipment.

Bidirectional flow is controlled by the embodiment 300. To this end, a seal and seat assembly is included on both faces of the flat valve disk 305. They are identical and differ only in the mounting relative to the flat valve disk. They are installed in the flat valve disk back to back as illustrated in FIG. 7. Each one is identical, and, therefore, a description of one should suffice for both.

The first valve seat assembly which incorporates the necessary seals for its operation is on the left of FIG. 7 and incorporates a ring 320 which fits within a drilled hole in the flat valve disk 305. The ring 320 has an external peripheral groove for receiving an O-ring seal 321. This seals against the wall of the drilled, cylindrical hole formed in the flat valve disk 305 during assembly of the apparatus. The ring 320 additionally incorporates a shoulder 322 on the inner axial passage through the ring. The shoulder receives a locking sleeve 323 which includes an edge located, overhanging shoulder 324. The shoulder 324 abuts a seat ring 325 which is captured at one face of the ring 320 so that the seat 325 seals against the face 304 of the valve body 301. The seat 325 is locked in the illustrated position by the overhanging shoulder 324 located at its inside face. This permits the seat, relatively flexible compared to the other components, to wipe against the face 304 and thereby perfect a seal against it.

The seal is perfected when a pressure differential occurs across the apparatus. The pressure differential can be from either end of the passage through the valve. To the extent that the seal ring 320 is constrained, there is, nevertheless, slight room for its axial movement so that it is forced against the face 304. When this occurs, the O-ring seal 321 around the periphery prevents leakage around the ring 320. The seat 325 prevents flow along the face 304. The seal assembly thus accomplishes the intended result.

A second seal generally identified at 333 is incorporated and is similarly constructed to the seal just described. It is mounted in opposite fashion. The two seals together thus accommodate a pressure differential from either direction and complete the seal which is necessary for the apparatus to operate.

Figure 8:
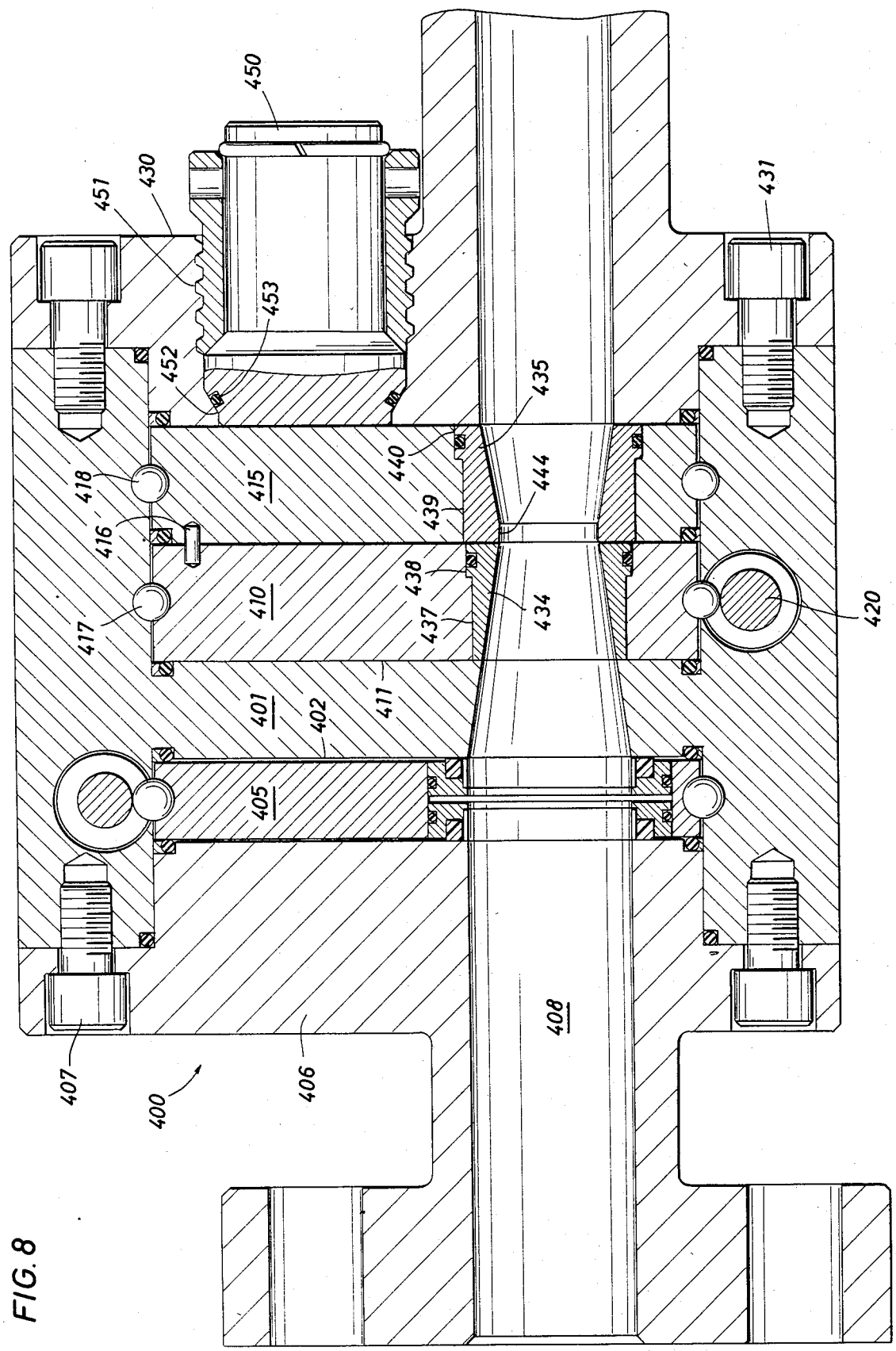
FIG. 8 is a sectional view of even another alternative embodiment of the valve of the present invention showing separate flat valve disks wherein one supports a constricted choke insert and wherein the structure further discloses a valve body having a plug which is removable to enable off-line replacement of the choke fitting.

Going now to FIG. 8 of the drawings, the numeral 400 identifies the embodiment illustrated in that view. Since a large portion of the structure functions in a similar fashion to that which was just described, certain portions of the description are abbreviated. Reference is made to the foregoing embodiments.

The number 401 identifies a valve body for a choke assembly. It is drilled from the lower end to define an internal flat face 402. A flat valve disk 405 is inserted and is similar to the flat valve disk 305 in FIG. 7 in construction and seal arrangement. The flat valve disk 405 incorporates bidirectional seals. It is rotated by an operator in the manner previously described and is held in position by the cylindrical plug 406 which is inserted from below, and flange bolts 407 anchor the plug in position. A passage through the valve is defined at 408.

The numeral 410 identifies a second flat valve disk which is received against an internal flat face 411. The face 411 is at the bottom a fairly deep drilled hole in the valve body 401. The flat valve disk 410 must be fairly tall compared to the flat valve disk 405. It can alternately be formed on one piece, but a more expedient approach is illustrated in FIG. 8 where a second valve disk 415 is positioned immediately adjacent to the first flat valve disk. The two rotate in unison and are, therefore, joined by a pin 416. This is advantageous in fabrication in that the flat valve disk 410 can be fabricated from the same blank utilized in fabrication of the flat valve disk 405. The disks 410 and 415 are drilled at the appropriate location to enable the pin 416 to be inserted between them to assure that they rotate in unison.

The flat valve disk is supported on a first set of bearings 417, and the second disk 415 is supported on bearings 418. The two sets of bearings function in the same manner as described hereinbefore, namely, a friction reducing means for supporting and aligning the flat valve disks for rotation.

By pinning the two disks together, they rotate in unison. It is expedient to join them together by means of the illustrated pin. Once this is accomplished, they can be rotated by a single operator, and the number 420 identifies an operator rod which rotates one of the flat valve disks and thereby rotates the second in unison. The operator is powered in the same manner as previously described.

The upper end of the apparatus is closed by a flanged insert 430 which is inserted and fastened in position by suitable bolts 431. The bolts 431 fasten the flanged insert in position and thereby define the complete passage 408 through the apparatus.

It will be observed that the passage 408 has a certain diameter which enables a specified flow rate through the equipment. However, the flow is constricted. The first flat valve disk 410 includes a sacrificial insert 434 adjacent to a second sacrificial insert 435 in the second flat valve disk. They are sacrificial, and, to this end, they are easily replaced. They are formed of hardened material and are tapered on the exterior to enable their insertion in series, locking in position to prevent incorrect insertion of the two inserts. The insert 434 has a first external diameter 437 which is the smaller diameter on the exterior, there being a larger diameter stepped at 438. This diameter is matched by the diameter 439 of the second insert, and it then steps to a larger diameter 440. External steps or an external taper are incorporated to lock the inserts in position. They also prevent incorrect installation of the inserts. The two inserts are stacked; that is to say, the top most insert in FIG. 8 must be removed because it has the larger external diameter. The smaller piece can be handled only after removing the top insert. The two inserts define an internal constriction 444 which may be scaled to be open or very constricted depending on the circumstances and application of the equipment. For instance, the constriction 444 can be extremely small, perhaps only a small percentage of the full opening 408. In the open position, the two inserts are aligned with the passage 408. The constriction 444 thus defines flow through the apparatus 400.

If the apparatus is utilized as a choke for the control of drilling mud, it encounters the risk of sand cutting of the constriction 444. The device is serviced by temporarily closing the flat valve disk 405. This is normally left open, except when closure is required. This occurs when the assembly 400 is taken out of service. The flat valve disk 405 is rotated to the closed position which stops all flow. The operator 420 is operated to rotate the flat valve disks 410 and 415 through approximately one-half revolution. The inserts within them are aligned with a plug 450 which is threaded at 451 on its exterior for easy removal. It is threaded into a matching thread drilled into the body of the insert 430. The plug 450 has a tapered end 452 which is sealed by an O-ring 453 to prevent leakage at the plug 450.

As will be observed, the plug 450 can be removed. It defines an opening of sufficient size to remove the sacrificial inserts. The plug 450 is thus removable to provide easy access to the inserts. The insert 435 is the first insert encountered on removal of the plug 450. The insert 435 is sufficiently small compared to the passage opened on removal of the plug that it can be easily removed. After the first or top insert 435 is removed, the bottom insert 434 is then removed. They can be inspected and replaced. On replacement, an alternate size can readily be installed. The two plugs incorporated in the apparatus are routinely used as a matched pair; they are used in pairs which are internally sized to provide a specified constriction. FIG. 8 shows how the two inserts at the constriction 444 provide a smooth transition in flow through the passage 408. Protruding shoulders are undesirable in the ordinary transition passage.

Operation of the mud choke valve 400 is then restored by returning the flat valve disks 410 and 415 to the in-line position.

The plug 450 is made in two components, the central parts being a plug which is telescoped on the interior of an external threaded sleeve. The sleeve is locked in position by means of a snap ring, and the sleeve further includes holes in it for receiving a spanner wrench or the like.

The flat valve disk of FIG. 8 can support first and second chokes at locations about 180.0 degrees apart and centered on a common radial length from the axis of rotation of the disk. So to speak, one can be switched into service while the second is exposed at the plug for service.

Certain economies in manufacture can be achieved. As an example, the valve body of FIG. 1 can be drilled wholly through to form a hollow cylinder with a passage therein. The cheaper approach is to place the transverse webbing in the valve body against an internal shoulder or perhaps pin the transverse webbing in place by radially extending pins. Using this approach, two-piece construction forms the flat circular faces on opposite sides of the webbing. This enables the webbing to be machined to parallel flat faces in an exposed manufacturing step at reduced cost. In like manner, the valve body is then easily handled to form concentric and machined drilled holes in it. Polishing can be achieved easily. Cutting of the grooves for the bearings 30 is quite easy.

FIG. 4 discloses the seals 82 and 84 partly in the flat valve disk and partly adjacent to it. The seals in other embodiments can also be positioned in the flat valve disks or adjacent thereto while still perfecting a seal. The seals function against the flat circular faces of the body or the flat valve disks and are conveniently located in either, normally preferring the component most readily assessible to machining.

While the foregoing is directed to the preferred embodiment of the present invention, other and further embodiments of the invention may be devised without departing from the basic concept thereof, the scope thereof is determined by the claims which follow.

I claim:

1. A rotary disk valve which comprises:
   (a) a hollow valve body having a at least one cavity therein with a smooth planar wall;
   (b) at least one flat circular valve disk supported in said cavity for rotary movement therein and in operative sealing engagement with said smooth planar wall, said flat valve disk having a pair of smooth parallel faces and having an opening therethrough asymmetrically positioned for rotation about the center of said disk;
   (c) said valve body having an inlet and an outlet with a passage therebetween passing through said cavity interrupted by said flat valve disk;
   (d) said valve disk being rotatable between a first position having the wall of said disk interrupting said passage and a second position having said disk opening aligned with said passage,
   (e) a removable valve sleeve insert slidably positioned in said flat valve disk opening adapted to be removed therefrom; and
   (f) spring means biasing said valve sleeve insert into operative sealing engagement with the smooth planar wall of said cavity, whereby said disk closes said passageway in said first position and opens said passageway in said second position.

2. A valve according to claim 1 wherein said valve sleeve insert includes a peripherally extending resilient face seal engaging said smooth planar wall in sealing contact therewith.

3. A valve according to claim 2 wherein said valve cavity has two spaced parallel smooth planar surfaces, and said valve disk has two oppositely facing valve sleeve inserts with spring means biasing the same into sealing contact, one with each of said spaced smooth planar surfaces.

4. A valve according to claim 1 wherein there are two valve disks in said valve body, each having a spring biased valve sleeve insert in an opening therethrough.

5. A valve according to claim 4 wherein said valve body has a single cavity in which said valve disks are positioned.

6. A valve according to claim 5 wherein said valve sleeve inserts have a sliding seal against opposite walls of said cavity.

7. A valve according to claim 5 wherein one of said valve disks has its valve sleeve positioned to contact said smooth planar wall, and the other of said valve disks has its valve sleeve positioned to contact the surface of said one valve disk.

8. A valve according to claim 4 wherein said valve body has two spaced cavities separated by a wall with an opening therein and each having spaced parallel smooth planar walls, said valve disks being positioned one in each of said cavities.

9. A valve according to claim 1 wherein said valve body comprises two separate parts, said inlet being in one part and said outlet in the other part, and said valve body parts being separable for assembly of said valve disk in said cavity.

10. A valve according to claim 8 wherein said valve body comprises three separate parts, said inlet being in the first valve body part, said outlet being in the second valve body part, and said separating wall being in the third valve body part, said first and second valve body parts being removably secured on said third valve body part for assembly of said two valve disks in said spaces cavities.

* * * * *